US007045566B2

(12) United States Patent
Chen et al.

(10) Patent No.: US 7,045,566 B2
(45) Date of Patent: May 16, 2006

(54) MOISTURE AND GAS PERMEABLE NON-POROUS IONOMERIC FILMS

(75) Inventors: John Chu Chen, Hockessin, DE (US); I-Hwa Lee, Wilmington, DE (US); Sam L. Samuels, Landenberg, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/704,935

(22) Filed: Nov. 11, 2003

(65) Prior Publication Data

US 2005/0037216 A1 Feb. 17, 2005

Related U.S. Application Data

(60) Provisional application No. 60/425,604, filed on Nov. 12, 2002.

(51) Int. Cl.
*C08K 5/98* (2006.01)
(52) U.S. Cl. .................. 524/394; 524/397; 524/398; 428/516; 428/500
(58) Field of Classification Search ............ 428/476.9, 428/515, 516, 523, 500; 524/381, 440, 456, 524/394, 397, 398
See application file for complete search history.

(56) References Cited

U.S. PATENT DOCUMENTS

| 2,241,322 A | 5/1941 | Hanford |
| 2,312,966 A | 3/1943 | Hanford |
| 2,512,606 A | 6/1950 | Bolton et al. |
| 3,278,663 A | 10/1966 | Graham |
| 3,337,665 A | 8/1967 | Underwood et al. |
| 3,344,014 A | 9/1967 | Rees |
| 3,393,210 A | 7/1968 | Speck |
| 3,456,044 A | 7/1969 | Pahlke |
| 3,645,992 A | 2/1972 | Elston |
| 4,076,698 A | 2/1978 | Anderson et al. |
| 4,174,358 A | 11/1979 | Epstein |
| 4,590,106 A | 5/1986 | Hsu et al. |
| 4,760,116 A | 7/1988 | Roberts |
| 4,769,421 A | 9/1988 | Hwo |
| 4,797,235 A | 1/1989 | Garland et al. |
| 4,886,634 A | 12/1989 | Strutzel et al. |
| 5,198,401 A | 3/1993 | Turner et al. |
| 5,405,922 A | 4/1995 | DeChellis et al. |
| 5,408,000 A | 4/1995 | Katsaros et al. |
| 2003/0198715 A1 * | 10/2003 | Morris et al. ............... 426/106 |

* cited by examiner

*Primary Examiner*—Melanie Bissett
(74) *Attorney, Agent, or Firm*—Kevin S. Dobson

(57) ABSTRACT

Moisture and gas permeable ionomeric films are described. The films described herein are obtained from blends of ionomers with an organic acid salt in the amount of at least about 5 wt %, and have MVTR greater than films obtained from conventional ionomers. Particularly preferred are the potassium salts of stearic, oleic, isostearic, and isooleic acids. Films comprising a liquid-absorbent ionomer film layer and an impermeable layer are provided. The films are suitable for preparation of tubular casings and shrinkbags, in particular, casings for smoked foodstuffs.

24 Claims, No Drawings

MOISTURE AND GAS PERMEABLE NON-POROUS IONOMERIC FILMS

This application claims the benefit of U.S. Provisional Application No. 60/425,604, filed Nov. 12, 2002.

FIELD OF THE INVENTION

The present invention relates to a moisture and gas permeable non-porous polymeric films. The present invention particularly relates to moisture/gas permeable ethylene acid copolymer ionomer films.

BACKGROUND DISCUSSION AND RELATED ART

Synthetic films having a high permeability to gases such as oxygen, and moisture can be useful in many applications. Typically, ethylene acid copolymers are not known for high water/gas permeability. However, ethylene acid copolymers and/or their ionomers have other properties that would make them desirable in applications where water/gas permeability is an important factor.

One application where it can be desirable to have an ethylene acid copolymer with high water/gas permeability is as a casing for foodstuffs, or in food packaging. Generally, foodstuff casings are made either of natural material such as cellulose or animal guts, or of synthetic material. Usually, the foodstuff is packed into the casing. When smoked products are desired, the encased foodstuff can be further subjected to a smoking process. In a conventional smoking process, the product is suspended in a chamber wherein it is exposed to hot smoke from burning wood. This process has the disadvantage that only natural casings can be used in this process, that is, those obtained from guts, for example, or cellulose or collagen casings which all show a natural permeability to smoke.

A critical point in the preparation and storage of smoked products is that the casings must show different permeabilities depending on the step of the process. A high permeability is needed at high temperatures (typically between 50 and 100° C.) and high humidity, during the smoking process. Once the product is smoked and cooled, it is preferable that the casing acts as a barrier against humidity so the permeability should preferably be low at temperatures less than 50° C., particularly less than 30° C.

Casings made from natural products and/or cellulose can present many disadvantages: they can be expensive; their great permeability to steam can cause significant weight loss from a foodstuff; the product can be unstable due to drying and/or superficial fat oxidation. Also, graying caused by microbial spoiling of the natural casing often appears on casings. The manufacturing process for fibrous and cellulose casings involves emissions of carbon disulfide and hydrogen sulfide to the atmosphere, which can be an environmental concern, or require expensive gas scrubbing systems to minimize emissions.

It can be desirable to have an ionomeric synthetic casing that can be used effectively and efficiently for storage and for a smoking process utilizing liquid smoke.

SUMMARY OF THE INVENTION

In one aspect, the present invention is a film having an oxygen transmission rate (OTR) of at least about 3000 cc·mil/m²·D, and a moisture vapor transmission rate (MVTR) of at least about 100 g·mil/m²·D, wherein the film comprises a blend of: (i) an ethylene acid copolymer ionomer present in an amount of from about 50 wt % to about 95 wt %; and, (ii) at least about 5 wt % of an organic acid salt.

In another aspect, the present invention is a laminate film comprising (1) a liquid absorptive inner layer useful for imparting flavor and color evenly to meat, and (2) an outer impermeable barrier layer wherein:

(A) the inner layer comprises a film having an oxygen transmission rate (OTR) of at least about 500 cc·mil/m²·D, and a moisture vapor transmission rate (MVTR) of at least about 1200 g·mil/m²·D, wherein the film comprises a blend of: (i) an ethylene acid copolymer ionomer present in an amount of from about 50 wt % to about 95 wt %; (ii) at least about 5 wt % of an organic acid salt; and (B) the outer impermeable film layer is a single film layer, or a laminate or multilayer film comprising: (a) at least one polymer layer comprising a polymer selected from polymers in the group consisting of: polyamides or mixtures thereof, polyester or mixture thereof, ethylene vinyl alcohol copolymers; polyvinylidene chloride; polyolefins; or mixtures of any of these; and (b) optionally at least one tie layer.

DETAILED DESCRIPTION OF THE INVENTION

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

Ionomers are ionic copolymers obtained by copolymerization of an alpha-olefin with an ethylenically unsaturated carboxylic acid comonomer (X) and, optionally, at least one softening comonomer (Y), followed by neutralization of at least a portion of the acid with a neutralizing agent. Ionomers are known conventionally and their method of preparation is described in, for example, U.S. Pat. No. 3,344,014.

Suitable alpha olefins are selected from alpha olefins in the group consisting of: alpha olefins having from 2 to 6 carbons and mixtures thereof. Suitable alpha olefins include, for example: ethylene (E); propylene; 1-butene; isobutene; 1-pentene; 2-methyl, 1-butene; 3-methyl, 1-butene; and isomers of 1-hexene such as 1-hexene and 2-methyl, 1-hexene.

Suitable acid comonomers are selected from the group consisting of: ethylenically unsaturated carboxylic acids, having from 3 to 8 carbon atoms and mixtures thereof. Suitable acids are acids that can be used conventionally in the preparation of acid copolymers and ionomers—for example, acids suitable for use in the manufacture of copolymer resins sold under the tradename of Surlyn® or Nucrel®. Suitable carboxylic acids include, for example: acrylic acid; methacrylic acid; and maleic acid.

Preferred neutralizing agents for the purposes of the present invention include at least one or more alkali metal, transition metal, or alkaline earth metal cation, such as sodium, potassium or zinc. More preferred in the practice of the present invention are ionomers comprising sodium and/or potassium cations. Most preferred are potassium salts.

Preferably, greater than 80% of the acid is neutralized, more preferably greater than 90% is neutralized. Most preferably, 100% of the acid in the ionomer blend is neutralized.

Suitable softening comonomers are alkyl esters of ethylenically unsaturated carboxylic acids. Preferably, a softening comonomer is selected from alkyl esters in the group consisting of: acrylic esters, methacrylic esters, and mixtures thereof (referred to collectively hereinafter as (meth)acrylic esters). More preferably, softening monomers are (meth) acrylic esters having alkyl groups of from 1 to 8 carbons. Suitable softening comonomers are, for example, methyl (meth)acrylate; ethyl (meth)acrylate; isopropyl (meth)acrylate; and n-butyl. (meth)acrylate.

Terpolymer ionomers can provide softer ionomeric resins. Suitable terpolymers include, for example: ethylene/(meth) acrylic acid/n-butyl (meth)acrylate; ethylene/(meth)acrylic acid/iso-butyl (meth)acrylate; ethylene/(meth)acrylic acid/ methyl (meth)acrylate; and ethylene/(meth)acrylic acid/ ethyl (meth)acrylate. Preferred are ethylene/(meth/acrylic acid/butyl (meth)acrylate copolymers.

Ionomers suitable for use herein can be melt-blended with other ionomers or polymers or modified by incorporation of fatty acids or salts thereof. For example, the copolymers can be melt blended with organic acids, particularly aliphatic, mono-functional organic acids having no more than 36 carbon atoms. Fatty acids or fatty acid salts, or mixtures thereof, having from 12 to 36 carbons are most preferred. Non-limiting, illustrative examples of preferred fatty acids are caproic, caprylic, capric lauric, myristic, palmitic, stearic, oleic, linoleic, erucic and behenic acids, and isomers thereof. Stearic and oleic acids are most preferred.

Particularly preferred are the salts of non-crystalline acids (at ambient temperatures) having branched alkyl substituents or unsaturation, such as isostearic acid salts and isooleic acid salts, for example. Non-crystalline branched acids give surprisingly good permeability properties. The counterion of the salt can be an alkali, transition, or alkaline earth metal ion, such as for example, ions obtained from lithium, sodium magnesium, calcium, and the like. Most preferred however, are the potassium salts of organic acids.

The organic acids and/or salts thereof (hereinafter referred to collectively as "acids", unless specific reference to an acid or a salt is made) are added in an amount sufficient to enhance the liquid absorptivity of the copolymer and/or disrupt the crystalinity of the ionomer. Preferably, the acids are added in an amount of from at least about 5 wt % of the total weight of copolymer and acids. More preferably, the acids are added in an amount of from at least about 10 wt %, even more preferably at least about 20 wt %. Preferably, the acids are added in an amount at least about 30 wt %. More preferably, the organic acids or salts thereof are added in an amount of up to about 50 wt %.

The organic acids can be added in either the acid form or the salt form. If added as the acid, then a neutralization step will have to be carried out on the blended ethylene copolymer composition. Likewise, the organic acid can be added to an ethylene acid copolymer or a copolymer ionomer. It can be preferred to add the organic acid already in the salt form to the ionomer. Complete neutralization of the organic acid can be preferred, depending upon the use and application of the ionomeric film.

The films of the present invention can be a blend of at least one E/X/Y copolymer ionomer and one or more organic acids or salts thereof, wherein X is required to be present in an amount of up to about 35 wt % of the polymer and Y is optionally present in an amount of up to about 50 weight percent of the polymer. Preferably X is present in an amount of from about 2 to about 30 wt % of the E/X/Y copolymer and Y is present in an amount of from about 0 to about 40 wt % of the E/X/Y copolymer. More preferably, X is present in an amount of from about 5 wt % to about 25 wt %, and most preferably in an amount of from about 10 wt % to about 20 wt %.

Inspection of the examples reported in Table 1 shows that a typical ethylene acid copolymer (Example C1) has very low moisture transmission. A typical non-modified ionomer exhibits some improvement in moisture transmission (Example C2). Modification of ionomers with fatty acid salts has an affect on the moisture transmission (Examples 1 through 8). In general, higher amounts of organic acid salt modifiers provide higher moisture vapor transmission rates. The counterion of the stearate can provide a significant difference in moisture transmission rates, with Mg<Na<K (Compare Examples 11 through 13 to Examples 3 through 10). Further improvements in moisture transmission rates can be made by increasing the neutralization level by the addition of hydroxide to provide 100% nominal neutralization. High levels of neutralization of the fatty acid salt-modified ionomers provide very good moisture transmission rates. Moisture vapor transmission rates of greater than 10,000 g·mil/m²·D can be achieved using potassium salts of noncrystalline organic acids, for example branched fatty acids such as iso-stearic acid, in fully neutralized compositions.

Preferably the films of the present invention have an OTR of at least 100 cc·mil/m²·24 hours (D). More preferably, films of the present invention have an OTR of at least about 500. More preferably, films of the present invention have an OTR of at least about 1,000. Even more preferably, a film of the present invention has an OTR in the range of from about 3,000 to about 25,000. However, the preferable OTR of a film of the present invention can depend on the application in which it finds use, and therefore the preferred ranges described herein may not reflect the preferred ranges in a given use or application.

Films of the present invention have an MVTR of at least about 100 g·mil/ m²·D. Preferably, films of the present invention have an MVTR of at least about 200, alternatively least about 500, or alternatively least about 750, or alternatively least about 1000, or alternatively least about 1200, or alternatively least about 1500, or alternatively least about 2500, or alternatively least about 10,000—depending upon the application in which the film is to be used. Particularly preferred for use in a sausage casing is a film of the present invention having an MVTR of from about 1200 to about 20,000.

Terpolymers having high X comonomer content, that is X comonomer content of greater than about 10 wt %, can be prepared using "co-solvent technology" as described in U.S. Pat. No. 5,028,674 or by employing somewhat higher pressures than those at which copolymers with lower acid can be prepared.

Ionomers useful in the practice of the present invention include ionomers obtained from E/(M)AA dipolymers having a weight average molecular weight ($M_w$) of from about 80,000 to about 500,000.

The Impermeable Outer Layer

A second essential component of the film of the present invention is an impermeable outer layer. An impermeable layer of the present invention comprises at least one layer of a polymer selected from polymers in the group consisting of: polyamides; polyester; polyolefins; anhydride-modified ethylene homo- and co-polymers. Optionally a second barrier polymer selected from polyethylene vinyl alcohol or polyvinylidene chloride can be included in a laminate film of the present invention Polyamides suitable for use herein include aliphatic polyamides, amorphous polyamides, or a mixture thereof. "Aliphatic polyamides" as the term is used herein can refer to aliphatic polyamides, aliphatic copolyamides, and blends or mixtures of these. Preferred aliphatic polyamides for use in the invention are polyamide 6, polyamide 6.66, blends and mixtures thereof. Polyamides 6.66 are commercially available under the tradenames "Ultramid C4" and "Ultramid C35" from BASF, or under the tradename "Ube5033FXD27" from Ube Industries Ltd. Polyamide 6 is commercially available under the tradename Nylon 4.12 from E.I. du Pont de Nemours, for example.

In a preferred embodiment of the invention, the aliphatic polyamide has a viscosity ranging from about 140 to about 270 cubic centimeters per gram (cm$^3$/g) measured according to ISO307 at 0.5% in 96% $H_2SO_4$.

The film may further comprise other polyamides such as those described in U.S. Pat. Nos. 5,408,000; 4,174,358; 3,393,210; 2,512,606; 2,312,966 and 2,241,322, which are incorporated herein by reference. The film may also comprise partially aromatic polyamides. A suitable partially aromatic polyamide is the amorphous copolyamide 6-I/6-T of the following formula:

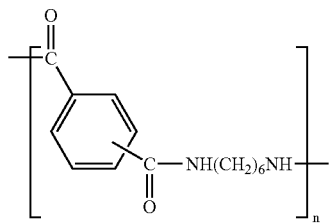

Some suitable partially aromatic copolyamides for use in the present invention are the amorphous nylon resins 6-I/6-T commercially available under the tradename Selar® PA from E.I. du Pont de Nemours and Company or commercially available under the tradename Grivory® G 21 from EMS-Chemie AG, for example.

Polyolefins suitable for use in the present invention are selected from polypropylenes, polyethylene polymers and copolymers. Polyethylenes useful for use herein can be prepared by a variety of methods, including well-known Ziegler-Natta catalyst polymerization (see for example U.S. Pat. Nos. 4,076,698 and 3,645,992), metallocene catalyst polymerization (see for example U.S. Pat. Nos. 5,198,401 and 5,405,922) and by free radical polymerization. Polyethylene polymers useful herein can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The densities polyethylenes suitable for use in the present invention range from 0.865 g/cc to 0.970 g/cc. Linear polyethylenes for use herein can incorporate alpha-olefin comonomers such as butene, hexene or octene to decrease their density within the density range so described. The impermeable layer of the present invention can comprise ethylene copolymers such as ethylene vinyl acetate and ethylene methyl acrylate and ethylene (meth)acrylic acid polymers. Polypropylene polymers useful in the practice of the present invention include propylene homopolymers, impact modified polypropylene and copolymers of propylene and alpha-olefins.

Anhydride or acid-modified ethylene and propylene homo- and co-polymers are used as extrudable adhesive layers (also known as "tie" layers) to improve bonding of layers of polymers together when the polymers do not adhere well to each other, thus improving the layer-to-layer adhesion in a multilayer structure. The compositions of the tie layers will be determined according to the compositions of the adjoining layers that need to be bonded in a multilayer structure. One skilled in the polymer art can select the appropriate tie layer based on the other materials used in the structure. Various tie layer compositions are commercially available under the tradename Bynel® from E.I. du Pont de Nemours and Company, for example.

Polyethylene vinyl alcohol ("EVOH") having from about 20 to about 50 mole % ethylene can be suitable for use herein. Suitable polyethylene vinyl alcohol polymers are commercially available under the tradename Evalca® from Kuraray or commercially available under the tradename Noltex® from Nippon Goshei, for example.

Polyvinylidene chloride (PVDC) suitable for use herein can be obtained commercially from Dow Chemical under the tradename Saran®, for example.

The impermeable barrier structure can comprise several layers of polymers to provide effective barriers to moisture and oxygen and bulk mechanical properties suitable for processing and/or packaging the foodstuff, such as clarity, toughness and puncture-resistance. For smoking and/or cooking processes, shrink properties can be important. Examples of multilayer barrier structures suitable for use in this invention include, from outermost to innermost: polyethylene/tie layer/polyamide/tie layer/polyethylene; polypropylene/tie layer/polyamide/EVOH/polyamide; and polyamide/tie layer/polyethylene/tie layer/polyamide. Depending on the nature of the innermost layer of the barrier structure, an additional inner tie layer can optionally be included to provide a desirable level of adhesion to the absorptive layer.

Impermeable films of the present invention can additionally comprise optional materials, such as the conventional additives used in polymer films including: plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, and/or mixtures thereof.

A laminate film of the present invention can be prepared by coextrusion as follows: granulates of the various components are melted in extruders. The molten polymers are passed through a die or set of dies to form layers of molten polymers that are processed as a laminar flow. The molten polymers are cooled to form a layered structure. Molten extruded polymers can be converted into a film using a suitable converting technique. For example, a film of the present invention can also be made by coextrusion followed by lamination onto one or more other layers. Other suitable converting techniques are, for example, blown film extrusion, cast film extrusion, cast sheet extrusion and extrusion coating. Preferably, the impermeable barrier film of the present invention is a blown film obtained through blown film extrusion.

A laminate film of the present invention can be further oriented beyond the immediate quenching or casting of the film. The process comprises the steps of coextruding a multilayer laminar flow of molten polymers, quenching the coextrudate and orienting the quenched, coextrudate in at least one direction. "Well-quenched" as the term is used herein describes an extrudate that has been substantially cooled below its melting point in order to obtain a solid film material.

The film may be uniaxially oriented, but is preferably biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760, 116; 4,769,421; 4,797,235 and 4,886,634.

In a preferred embodiment of the present invention, the laminate film of the present invention is oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which will induce longitudinal orientation.

The processing to obtain an oriented blown film is known in the art as a double bubble technique, and can be carried out as described by Pahlke in U.S. Pat. No. 3,456,044. More particularly, a primary tube is melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties. For preparation of food casings (for example, sausage casings) it may be desirable to maintain the film in a tubular form. For preparing flat films the tubular film can be slit along its length and opened up into flat sheets that can be rolled and/or further processed.

In one embodiment, the absorptive inner layer with an optional tie layer, can be extrusion-coated onto a preformed barrier structure to form a film of this invention.

Preferably, the film of the invention can be processed on the film fabrication machine at a speed from about 50 meters per minute (m/min) to a speed of about 200 m/min.

Films of the present invention can be useful for encasing and processing foodstuffs. Typically, the films are made into tubular casings, either by using blown film techniques to prepare a tubular form directly or by forming a flat sheet of the film into a tubular structure and fastening the edges of the sheet in a seam running the length of the tube. To facilitate the introduction of the foodstuff into the interior of the tubular casing, the casing optionally may be shirred prior to the introduction of the foodstuff. The term "shirred" means that the tubular casing is gathered into a multiplicity of rows parallel to the circumference of the tubing. The foodstuff is introduced into the interior of the optionally shirred tubular casing via the open end and the tube is stretched out to encase the foodstuff. One skilled in the art of packaging foodstuffs can readily introduce the foodstuff into the casing using well-established procedures.

The tubular casing can be further treated by the adsorption of at least one liquid food-processing flavorant and/or colorant into the absorbent layer of the casing. The flavorant and/or colorant is subsequently transferred to the foodstuff during such food processing as heating, curing, smoking, or cooking, for example.

In a preferred embodiment, a tubular casing of this invention comprises liquid smoke as the food-processing material which acts as both a flavorant and a colorant. Liquid smoke is well known to one skilled in the art of food processing and numerous variants are known and commercially available. Preferably a tubular casing comprising liquid smoke can be useful for processing sausage.

Foodstuffs that can be processed using film of this invention include beef, pork, poultry (for example, chicken and turkey), seafood (for example, fish and mollusks) and cheese. Meat products can be whole-muscle, formed into shapes, or ground. In the case of formed or ground meat, the meat can optionally be a mixture of material derived from more than one species. The foodstuff can be processed prior to its introduction into a casing of the present invention and then further processed in the casing.

In another embodiment, films of the present invention can also be used for packaging foodstuffs where it is desirable to have absorption of moisture from the foodstuff, while retaining moisture within the packaging. Films of this invention can be used, for example, to package uncooked meat or cooked meats (e.g. beef, pork, poultry or seafood) wherein moisture from the foodstuff or excess marinades on the foodstuff can pass out of the foodstuff and pool below.

EXAMPLES

The following Examples are merely illustrative, and are not to be construed as limiting to the scope of the invention described and/or claimed herein.

Examples 1 through 6

Ionomer 1 is a terpolymer comprising ethylene, n-butyl acrylate (23.5 weight %) and methacrylic acid (9 weight percent), neutralized to 52% (nominally) with sodium using sodium hydroxide, having a melt index of 1.

Ionomer 2 is a copolymer comprising ethylene and methacrylic acid (10 weight percent), neutralized to 55% (nominally) with sodium using sodium hydroxide, having a melt index of 1.3.

Ionomer 3 is a copolymer comprising ethylene and methacrylic acid (19 weight percent), neutralized to 37% (nominally) with sodium using sodium hydroxide, having a melt index of 2.6.

Ionomer 4 is a copolymer comprising ethylene and methacrylic acid (15 weight percent), neutralized to 59% (nominally) with sodium using sodium hydroxide, having a melt index of 0.93.

Ethylene acid copolymer 1 (EAC-1) is a terpolymer comprising ethylene, n-butyl acrylate (23.5 weight %) and methacrylic acid (9 weight percent), having a melt index of 25. this is the base resin for Ionomer 1 prior to neutralization.

Ethylene acid copolymer 2 (EAC-2) is a terpolymer comprising ethylene, n-butyl acrylate (15.5 weight %) and acrylic acid (10.5 weight percent), having a melt index of 60.

Ethylene acid copolymer 3 (EAC-3) is a terpolymer comprising ethylene, n-butyl acrylate (23.5 weight %) and methacrylic acid (9 weight percent), having a melt index of 200.

Ethylene acid copolymer 4 (EAC-4) is a terpolymer comprising ethylene, n-butyl acrylate (28 weight %) and acrylic acid (6.2 weight percent), having a melt index of 200.

Ethylene acid copolymer 5 (EAC-5) is a terpolymer comprising ethylene, n-butyl acrylate (15.5 weight %) and acrylic acid (8.5 weight percent), having a melt index of 60.

Employing a Werner & Pfleiderer twin-screw extruder, ionomer 1 was melt blended with potassium stearate at 15 weight %, 30 weight % and 40 weight % to provide Examples 3 through 5. Similarly, ionomer 2 was melt blended with potassium stearate at 15 weight %, 30 weight % and 40 weight % to provide Examples 6 through 8. Examples 7–11 were prepared similarly, using the indicated ionomer or ethylene acid copolymer blended with the indicated fatty acid salt modifier. Employing a Werner & Pfleiderer twin-screw extruder, ionomer 3 was melt blended with 40 weight % of potassium stearate and additional potassium hydroxide to neutralize the composition to nominally 100% neutralization to provide Example 12. Other examples were prepared similarly, using the indicated ionomer or ethylene acid copolymer blended with the indicated fatty acid modifier and neutralized to 100% nominal neutralization with the hydroxide salt of the indicated cation.

High levels of neutralization. (over 80%) were provided by adding the stoichiometric amount of a cation source needed to neutralize the target amount of acid moieties in the acid copolymer and organic acid(s) in the blend (Nominal % Neutralization). One skilled in the art will appreciate that in cases of very high levels of neutralization (over 90% and especially at or near 100%), it can be difficult to determine analytically whether all of the individual acid moieties in the blend are neutralized. Similarly, it can also be difficult to determine whether any individual acid moiety is not neutralized. However, sufficient cations are made available in the blend so that, in aggregate, the indicated level of neutralization is achieved.

The Examples were converted into monolayer films of proximately 3 mils in thickness through the blown film process. The films were measured for the oxygen and moisture vapor transmission rates. The permeation properties are described in the following Table 1. For samples with high water permeability, the water vapor transmission tests were conducted on a Mocon Permatran-W® 101K, following ASTM D6701-01, at 37.8 C. For the other samples, the transmission tests were conducted on a Mocon Permatran-W® 700, following ASTM F1249-01. For oxygen transmission rate measurement the test was conducted on a Mocon Ox-tram® 2/21 at 23 C and 50% RH.

TABLE 1

Transmission Characteristics

| Example | Base polymer | Modifier (wt. %) | Oxygen Transmission Rate (cc·mil/m²-D) | Moisture Vapor Transmission Rate (g·mil/m²-D) |
|---|---|---|---|---|
| C1 | EAC-5 | none | | 2 |
| C2 | Ionomer 4 | none | | 47 |
| 1 | Ionomer 1 | K Stearate (15%) | 18,770 | 930 |
| 2 | Ionomer 1 | K Stearate (30%) | 18,104 | 1,953 |
| 3 | Ionomer 1 | K Stearate (40%) | 16,120 | 5,394 |
| 4 | Ionomer 2 | K Stearate (15%) | 7,905 | 46.5 |
| 5 | Ionomer 2 | K Stearate (30%) | 8,602 | 1,178 |
| 6 | Ionomer 2 | K Stearate (40%) | 7,982 | 232 |
| 7 | EAC-5 | K Stearate (15%) | | 507 |
| 8 | EAC-5 | K Stearate (45%) | | 2,795 |
| 9 | EAC-5 | Na Stearate (15%) | | 72 |
| 10 | EAC-5 | Na Stearate (45%) | | 35 |
| 11 | Ionomer 3 | Mg Stearate (40%) | | 31 |
| 12 | Ionomer 3 | K Stearate (40%) 100% neutralized with K | | 5,387 |
| 13 | Ionomer 1 | K Stearate (40%) 100% neutralized with K | 16,120 | 5,279 |
| 14 | Ionomer 3 | K iso-stearate (20%) 100% neutralized with K | | 10,290 |
| 15 | Ionomer 3 | K iso-stearate (30%) 100% neutralized with K | | 12,578 |
| 16 | Ionomer 3 | K iso-stearate (40%) 100% neutralized with K | | 10,222 |
| 17 | Ionomer 3 | K iso-stearate (50%) 100% neutralized with K | | 12,408 |
| 18 | Ionomer 3 | K iso-stearate (20%) 100% neutralized with K | | 918 |
| 19 | Ionomer 3 | K iso-stearate (40%) 100% neutralized with K | | 6,013 |
| 20 | EAC-1 | K iso-stearate (40%) 100% neutralized with K | | 28,089 |
| 21 | Ionomer 3 | K iso-stearate (40%) 100% neutralized with K | | 78,535 |
| 22 | Ionomer 3 | K iso-stearate (50%) 100% neutralized with K | | 103,927 |
| 23 | Ionomer 3 | Na Stearate (40%) 100% neutralized with Na | | 3,491 |
| 24 | Ionomer 4 | Na Stearate (40%) 100% neutralized with Na | | 1,220 |
| 25 | EAC-1 | Mg iso-stearate (40%) 100% neutralized with Mg | | 176 |
| 26 | EAC-3 | Mg iso-stearate (40%) 100% neutralized with Mg | | 104 |
| 27 | EAC-4 | Mg iso-stearate (40%) 100% neutralized with Mg | | 308 |

What is claimed is:

1. A film having an oxygen transmission rate (OTR) of at least about 100 cc·mil/m²·D, and a moisture vapor transmission rate (MVTR) of at least about 200 g·mil/m²·D, wherein the film comprises a blend of: (i) an ethylene acid copolymer ionomer present in an amount of from about 50 wt % to about 95 wt %; and, (ii) at least about 5 wt % of an organic acid salt.

2. The film of claim 1 wherein the organic acid salt is present in an amount of at least about 10 wt %.

3. The film of claim 2 wherein the organic acid salt is present in an amount of at least about 20 wt %.

4. The film of claim 3 wherein the organic acid salt is present in an amount of at least about 30 wt %.

5. The film of claim 4 wherein the organic acid salt is present in an amount of up to about 50 wt %.

6. The film of claim 5 wherein the organic acid salt has no more than 36 carbon atoms.

7. The film of claim 6 wherein the organic acid salt has from 12 to 36 carbon atoms.

8. The film of claim 7 wherein: (1) the salt is of an acid selected from the group consisting of: caproic, caprylic, capric lauric, myristic, palmitic, stearic, oleic, linoleic, erucic and behenic acids; and isomers thereof; and (2) the counterion is at least one metal ion derived from metals in the group consisting of alkali metals, transition metals, and alkaline earth metals.

9. The film of claim 8 wherein the acid is selected from the group consisting of: isomers of caproic, caprylic, capric lauric, myristic, palmitic, stearic, oleic, linoleic, erucic and behenic acids and the metal counterion is potassium ion.

10. The film of claim 9 wherein the acid is selected from the group consisting of: isomers of stearic acid and oleic acid.

11. The film of claim 10 wherein the acid is selected from the group consisting of: branched isomers of stearic acid and oleic acid.

12. The film of claim 11 wherein the acid is isostearic acid.

13. The film of claim 12 wherein the film has an OTR of at least about 500.

14. The film of claim 13 having an OTR of at least about 1000.

15. The film of claim 14 having an OTR of at least about from about 3000 to about 25,000.

16. The film of claim 12 having an MVTR of at least about 500.

17. The film of claim 16 having an MVTR of at least about 750.

18. The film of claim 17 having an MVTR of at least about 1000.

19. The film of claim 18 having an MVTR of at least about 1200.

20. The film of claim 19 having an MVTR of at least about 1500.

21. The film of claim 20 having an MVTR of at least about 2500.

22. The film of claim 21 having an MVTR of at least about 10,000.

23. The film of claim 22 having an MVTR of from about 10,000 to about 20,000.

24. A laminate film comprising a liquid absorptive inner layer and an impermeable outer layer wherein: the absorptive layer comprises the film of claim 20 and the outer impermeable film layer is a single film layer, or a laminate or multilayer film comprising: (a) at least one polymer layer comprising a polymer selected from polymers in the group consisting of: polyamides or mixtures thereof, ethylene vinyl alcohol copolymers; polyvinylidene chloride; polyolefins; or mixtures of any of these; and (b) optionally at least one tie layer.

* * * * *